(No Model.)
E. NOPPEL.
APPARATUS FOR PURIFYING OIL.
No. 477,061. Patented June 14, 1892.
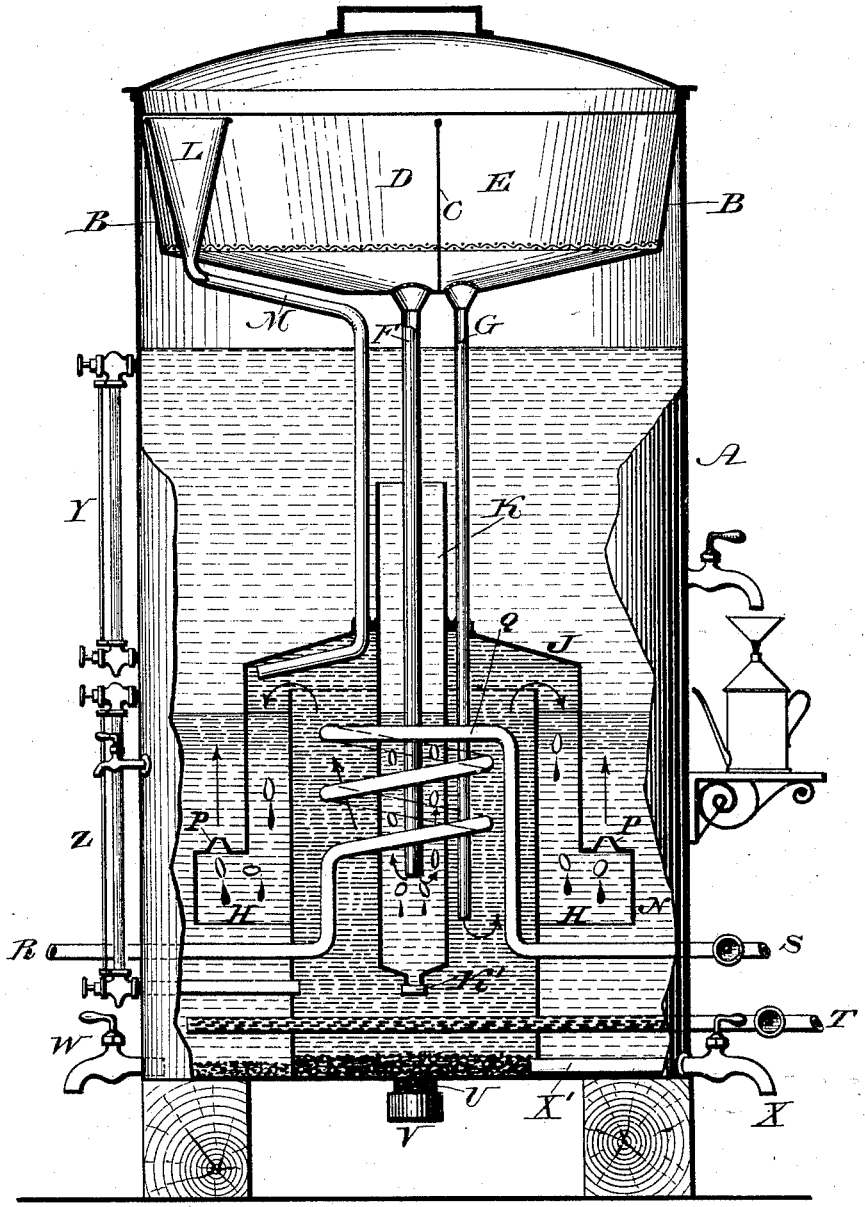
WITNESSES:
L. Douville,
Wm. E. Wiedersheim.
INVENTOR
Emil Noppel
BY John A. Wiedersheim
ATTORNEY.

UNITED STATES PATENT OFFICE.

EMIL NOPPEL, OF PHILADELPHIA, PENNSYLVANIA.

APPARATUS FOR PURIFYING OIL.

SPECIFICATION forming part of Letters Patent No. 477,061, dated June 14, 1892.

Application filed October 24, 1891. Serial No. 409,700. (No model.)

*To all whom it may concern:*

Be it known that I, EMIL NOPPEL, a citizen of the United States, residing in the city and county of Philadelphia, State of Pennsylvania, have invented a new and useful Improvement in Apparatus for Purifying Oil and Separating New Oil from Drippings, which improvement is fully set forth in the following specification and accompanying drawing.

My invention consists of improvements in apparatus for purifying oil which has been used in lubricating and separating new oil from drippings, the same embodying a tank, chambers therein, heating, blow-off, and cleansing devices, and means for purifying or refining new oil without having the same pass through the drippings or old oil in the tank or agitating the sediment therein, the construction of the parts being hereinafter fully set forth.

The figure represents a vertical section of an apparatus embodying my invention.

Referring to the drawing, A designates a tank, within which at the upper end thereof is supported a funnel or reservoir B, the latter having therein a vertical diaphragm C, dividing the reservoir into two compartments D E. The compartment D is provided with a pipe F, the same depending from the bottom thereof, the chamber E having a pipe G, which likewise depends from the bottom thereof. Rising from the bottom of the tank A is a cylinder H, over which is an inverted cylinder J, the same thus being closed at top and open at bottom. Within the cylinder H is a cylinder K, which is closed at bottom and open at top and passes through the top of the cylinder J, it being noticed that portion of the pipe F enters the cylinder K and portion of the pipe G passes through the top of the cylinder J and enters the cylinder H, it being also noticed that the pipe G is secured to the top of the cylinder J, and the cylinder K is also secured to said top, whereby when the reservoir B is removed the cylinders J K may be removed with the same and said parts may be afterward readily restored to position.

Within the reservoir B is a funnel L, which is provided with a pipe M, the outlet portion of said funnel passing through the bottom of said reservoir, where the pipe M is attached, said pipe passing into the tank A and having its lower end within the cylinder J. At the base of the cylinder J is a chamber N, the top wall of which is provided with nozzles P. Within the cylinder H is a pipe Q, which freely encircles the cylinder K and pipe G, said pipe Q having branches R and S at opposite ends for the passage of steam into and therethrough for the purpose of heating the contents of the cylinder H and of the cylinder K, if so desired.

T designates a pipe which passes through the tank A and cylinder H, the portion within said tank and cylinder being perforated, whereby steam may be admitted into said tank and cylinder for blow-off purposes.

In the bottom of the cylinder H is an outlet U, which is closed by a cap V, and the lower portion of the tank A is provided with cocks W X, the cock W opening into said tank and the cock X having a branch X', which passes through the tank into the cylinder H.

Y designates a gage for indicating the height of oil in the tank A, and Z designates a gage for indicating the height of oil in the cylinder H.

The operation is as follows: Oil to be purified and refined is poured into the compartment E and after passing through the pipe G enters the cylinder H and fills the same to overflowing, said cylinder being surrounded by water, into which the sides of the cylinder J and the chamber N dip, it being seen that the oil then enters the water between the two cylinders J H and descends through the water to the chamber N, where it escapes through the nozzles P and rises through the water outside of the chamber J, it having been washed in its passage through the water. The sediment in the chamber H settles at the bottom thereof, from whence it may be withdrawn through the discharge U, and the sediment in the tank may be discharged by the cock W, said cock also providing means for clearing the tank entirely of its contents when so desired, while the cock X may be employed for discharging the cylinder H entirely of its contents. When it is desired to heat the contents of the cylinder H to assist in the purifying and refining operation, steam is admitted to the coil Q, and the heat of the contents of the cylinder H may be utilized to heat the cylinder K. Should the supply in the tank of the purified oil be reduced by reason of its being drawn off, new oil may be poured into the compartment D. It is directed into the cylinder K by means of the pipe F and escapes at the bottom of the latter into said cylinder, which contains a quantity of water or purifying or refining material, through which the oil rises and in which it is washed, the oil then overflowing at the top of the cylinders K into the tank A, from whence it may be withdrawn, it being noticed that the new oil has not entered the cylinders H J or passed through the dripping, and there is consequently no disturbance or agitation of the sediment in said cylinder or in the tank, it being noticed that the apparatus thus serves both as an oil-tank and a purifier.

The bottom of the cylinder K is closed by a cap or plug K', whereby any sediment therein may be removed when the cylinder is removed from the tank.

The pipe M may be employed to remove gas from the cylinders H and J and to replenish the tank with water.

In speaking of the cylinders I do not limit myself to the shape as such, as they are meant to include any vessel or chamber of the same capabilities.

Having thus described my invention, what I claim as new, and desire to secure by Letters Patent, is—

1. A tank having the cylinder H therein, the same being closed at bottom and open at top, the cylinder K in said cylinder J, the supply-pipe F entering said cylinder K, the inverted cylinder J over said cylinder H, and the outlet U at the bottom of the vessel, said parts being combined substantially as set forth.

2. An apparatus for the purpose set forth, consisting of a tank having a reservoir in its upper part, the cylinder H in its lower part with a space between its wall and that of the tank, a cylinder covering said first cylinder and having a lower chamber with openings in its top, and a pipe leading from said reservoir to said first cylinder, said parts being combined substantially as described.

3. An apparatus for the purpose set forth, having a tank with an inner cylinder, a covering-cylinder for first cylinder, having a lower chamber with openings in its top, and a funnel with a pipe leading into said covering-cylinder, substantially as described.

4. An apparatus for the purpose set forth, consisting of a tank, a reservoir in the upper part thereof having a partition therein forming two chambers, a cylinder in the lower part of said tank, an inner cylinder covering said first cylinder and having at its lower end a chamber with openings in its top wall, a cylinder open at its top and closed at its bottom, having its lower end within said first cylinder and supported on said second cylinder, a pipe leading from one of said chambers to said first cylinder, and a pipe leading from the other chamber to said inner cylinder, said parts being combined substantially as described.

EMIL NOPPEL.

Witnesses:
JOHN A. WIEDERSHEIM,
A. P. JENNINGS.